United States Patent [19]

Yoshida et al.

[11] Patent Number: 4,743,652

[45] Date of Patent: May 10, 1988

[54] ELASTOMERIC COPOLYMER OF AROMATIC VINYL COMPOUNDS AND BUTADIENE

[75] Inventors: Nobuyuki Yoshida, Ichihara; Yasushi Okamoto, Ibaraki; Akio Imai; Tomoaki Seki, both of Ichihara; Hiroshi Furukawa, Ashiya; Yuichi Saito, Nishinomiya, all of Japan

[73] Assignees: Sumitomo Chemical Co., Ltd., Osaka; Sumitomo Rubber Industries, Ltd., Kobe, both of Japan

[21] Appl. No.: 5,400

[22] Filed: Feb. 2, 1987

Related U.S. Application Data

[63] Continuation of Ser. No. 704,453, Feb. 22, 1985, abandoned.

[30] Foreign Application Priority Data

Feb. 24, 1984 [JP] Japan ................................. 59-34946

[51] Int. Cl.$^4$ ................................. C08F 8/42
[52] U.S. Cl. ..................... 525/105; 525/332.9; 525/342; 525/359.1; 525/359.5; 525/360; 525/371
[58] Field of Search ..................... 525/105, 342, 359.1, 525/359.5, 360, 371

[56] References Cited

U.S. PATENT DOCUMENTS

| | | | |
|---|---|---|---|
| 4,086,298 | 4/1978 | Fahrbach et al. | 525/342 |
| 4,167,545 | 9/1979 | Fahrbach et al. | 525/342 |
| 4,482,678 | 11/1984 | Furukawa et al. | 525/342 |
| 4,523,618 | 6/1985 | Yamamoto et al. | 525/342 |

FOREIGN PATENT DOCUMENTS

0048619 3/1982 European Pat. Off. .
985614 3/1965 United Kingdom .

*Primary Examiner*—Joseph L. Schofer
*Assistant Examiner*—Bernard Lipman
*Attorney, Agent, or Firm*—Armstrong, Nikaido, Marmelstein & Kubovcik

[57] ABSTRACT

An elastomeric copolymer of an aromatic vinyl compound and butadiene prepared by a solution polymerization method, which has a glass transition temperature of not less than $-50°$ C. and contains polymer chains modified with a trifunctional or tetrafunctional coupling agent, and which contains not less than 3% by weight to less than 23% by weight, based on the whole polymer chains, of polymer chains having a molecular weight of at least 5 times a molecular weight corresponding to a peak appearing on the low molecular weight side of a high performance liquid chromatogram of the elastomeric copolymer. The elastomeric copolymer has an excellent processability and shows a low rolling resistance and a high wet grip characteristic when used as a rubber component in tires.

5 Claims, No Drawings

ELASTOMERIC COPOLYMER OF AROMATIC VINYL COMPOUNDS AND BUTADIENE

This application is a continuation of application Ser. No. 704,453, filed 2-22-85, now abandoned.

BACKGROUND OF THE INVENTION

The present invention relates to an improved elastomeric copolymer of an aromatic vinyl compound and butadiene containing polymer chains with a molecular weight higher than a certain level in a specific proportion and being suitable for use in tires. More particularly, the invention relates to a rubber-like aromatic vinyl compound/butadiene copolymer having a glass transition temperature of not less than $-50°$ C., a specific proportion of the polymer chains of which have a molecular weight higher than a particular level and which has a low rolling resistance, a large resistance against a wet road (the resistance being hereinafter referred to as "wet grip") and an excellent processability.

In recent years, reduction of running fuel cost of automobiles is strongly demanded from the viewpoint of energy saving. Especially, it is of urgent necessity for the tire manufacturing industry to decrease the rolling resistance of tires, because the rolling resistance has an important influence of fuel saving.

Among the constituent elements of a tire, a tread rubber accounts for the largest proportion of the travelling resistance accompanied by rolling of the tire, and it is known that the tread rubber accounts for about 40% of the rolling resistance of the tire at large. The rolling resistance of a tire results from energy loss accompanied by repeated deformation of a running tire. Thus, the reduction of the rolling resistance is no more than reducing such an energy loss. Particularly, considering it with respect to the motion of a tread rubber, it is necessary to reduce energy loss due to a bending and shearing motion and a compressive motion. From the viewpoint of the dynamic viscoelastic characteristic of a rubber, this means reduction of the loss modulus ($E''$) and the loss compliance [$E''/(E^*)^2$ wherein $E^* = E' + iE''$, and $E^*$ is complex modulus, $E'$ is storage modulus and $i^2 = -1$]. Further, these motions are repeated motions attended on rotation of a tire, and the frequency thereof is from 10 to $10^2$ Hz. Accordingly, it is necessary for the reduction of the rolling resistance of tires to decrease the loss modulus and loss compliance of a tread rubber in 10 to $10^2$ Hz.

On the other hand, considering from the safety side in running of a car, the wet grip characteristic is an important characteristic required for tires. It is a characteristic concerning travelling performances such as steering stability and breaking performance on a wet road such as a road at the time of raining, and is a frictional resistance which is caused by contact of the tread surface of a tire with the road. In other words, since a tire shows a recovery from deformation with a time lag to a stress receiving from the road surface, a torque of a reverse direction to the running direction is generated. The resistance due to this torque is the frictional resistance, and is related to the loss coefficient (tan $\delta$) from the viewpoint of the viscoelastic characteristic, provided that $\delta$ is a phase difference between stress and strain, and tan $\delta = E''/E'$. Further, the frequency of the stress caused by the road is a very high frequency attended on the unevenness of road, and according to literature (e.g. Rubber Chemistry and Technology, Vol. 4, page 4), the frequency is from $10^4$ to $10^7$ Hz. Therefore, in order to improve the wet grip characteristic of tires, it is necessary to raise the loss coefficient of a tread rubber in $10^4$ to $10^7$ Hz.

In a tread rubber compound generally and widely used heretofore, natural rubber, polyisoprene rubber, high-cis-1,4-polybutadiene rubber and styrene-butadiene rubber are mainly used as a rubber component. The former three are superior in rolling resistance, but are poor in wet grip characteristic. On the other hand, a styrenebutadiene rubber is superior in wet grip characteristic, but is poor in rolling resistance. Therefore, a tread rubber composition having excellent both properties of the rolling resistance and the wet grip characteristic has not been obtained. A tread rubber composition has been used at the cost of either one property, or with keeping balance between the both properties by blending the above-mentioned elastomers. However, the present state is considered far from sufficient for the level demanded in recent years with regard to keeping a high wet grip characteristic and keeping a low rolling resistance at the same time.

The present inventors made a study of the preparation of a polymer having excellent processabilities such as kneading processability, roll processability and extrusion processability required in tire manufacturing as well as a fundamental study of the repugnant rolling and wet grip characteristics, and they found, as described in Japaneses Patent Application No. 53387/1982, that a polymer having a particular structure has a high wet grip characteristics and an excellent rolling resistance characteristics together with an excellent roll processability. The present inventors have continued the study in order to further improve the processabilities such as kneading processability, roll processability and extrusion processability required in tire manufacturing with maintaining a high wet grip characteristic and an excellent rolling resistance characteristic, and have now reached the present invention.

It is an object of the present invention to provide a rubber material suitable for use in the tread portion of tires.

A further object of the invention is to provide an elastomeric copolymer having improved processabilities required in tire manufacturing and capable of providing tires having excellent wet grip and rolling characteristics.

These and other objects of the present invention will become apparent from the description hereinafter.

SUMMARY OF THE INVENTION

In accordance with the presnt invention, there is provided an elastomeric copolymer of an aromatic vinyl compound and butadiene prepared by a solution polymerization method, which has a glass transition temperature of not less than $-50°$ C. and contains polymer chains modified with a trifunctional or tetrafunctional coupling agent, and in which not less than 3% by weight to less than 23% by weight of the whole polymer chains have a molecular weight of at least 5 times a molecular weight corresponding to a peak appearing on the low molecular weight side of a high performance liquid chromatogram of the elastomeric copolymer.

DETAILED DESCRIPTION

The aromatic vinyl compounds used in the present invention include, for instance, styrene, styrene derivatives having a substituent on the benzene ring such as m-methylstyrene, p-methylstyrene and p-tert-butylstyrene, styrene derivatives having a substituent on the vinyl group such as α-methylstyrene, and the like. In particular, a styrene is preferred because of being easily obtainable upon practicing on an industrial scale. The content of the aromatic vinyl compound in the copolymer is usually from 15 to 50% by weight, but is not limited thereto.

It is necessary that the glass transition temperature of the elastomeric copolymer of the present invention is not less than −50° C. When the glass transition temperature is less than −50° C., the wet grip characteristic is lowered. The glass transition temperature of the polymer is determined by the microstructure of the polymer, namely the 1,2-vinyl bonding content and the content of the aromatic vinyl compound. The glass transition temperature rises with increasing these contents.

In the distribution of molecular weight (the molecular weight as shown herein means one calculated on the basis of a standard polystyrene) of the copolymer of the invention obtained by high performance liquid chromatography, it is necessary that the polymer chains having a molecular weight of at least 5 times the molecular weight corresponding to the peak appearing on the low molecular weight side of the distribution curve are present in an amount of not less than 3% by weight to less than 23% based on the whole polymer chains. When the content of such polymer chains is less than 3% by weight or not less than 23% by weight, the processability is lowered, and accordingly no good rubber sheet is obtained at the time of roll and calendering processing and also a difficulty is encountered by kneading and extrusion processing.

Further, it is necessary that the copolymer of the present invention contains polymer chains modified with a trifunctional or tetrafunctional coupling agent. In case that a copolymer of an aromatic vinyl compound and butadiene does not contain the modified polymer chains and is composed of only linear polymer chains, the content of polymer chains having a molecular weight of at least 5 times a molecular weight corresponding to a peak appearing on the low molecular weight side of the high performance liquid chromatogram (molecular weight distribution curve of the copolymer obtained by high performance liquid chromatography) is always less than 3% by weight. Such a copolymer substantially composed of linear polymer chains is low in processability, and no good rubber sheet is obtained in roll and calendering processing. Also, a difficulty is encountered by kneading and extrusion processing. Preferably, the elastomeric copolymer of the present invention is in the form of composite molecules obtained by coupling the polymer molecules with a trifunctional or tetrafunctional coupling agent, and contains the coupled polymer (branched polymer) and the uncoupled polymer (linear polymer). Such a copolymer shows at least two peaks in the distribution of molecular weight, one being for the uncoupled polymer and the others being for the coupled polymers. More preferably, the polymer chains modified with a trifunctional or tetrafunctional coupling agent are present within the range of not less than 35% by weight to less than 90% by weight of the whole polymer chains of the copolymer.

The content of the polymer chains having a molecular weight of at least 5 times the molecular weight corresponding to a peak appearing on the low molecular weight side of the chromatogram can be controlled by selecting the polymerization conditions, for instance, by selecting and combining the conditions such as polymerization temperature, residence time in a polymerization tank, rate of adding monomers and amount of a trifunctional or tetrfunctional coupling agent.

It is one of the features of the present invention that the aromatic vinyl compound/butadiene copolymer is defined by a measure capable of quantitatively representing the processability, namely the content of the polymer chains having a molecular weight of at least 5 times the molecular weight corresponding to a peak appearing on the low molecular weight side of the high performance liquid chromatogram. Polymers defined by such a measure has been neither reported nor known prior to the present invention. It has been considered that a polymer having a high Mooney viscosity is generally poor in processability. However, the polymer prepared under such conditions as satisfying the above-mentioned measure has an excellent processability. For instance, the copolymers of the present invention show a low rolling resistance and moreover have an excellent processability in spite of having a Mooney viscosity of not less than 60 ($ML_{1+4}$, 100° C.). With decreasing the Mooney viscosity, the processability generally becomes better, but the rolling resistance becomes high and such copolymers are unsatisfactory in point of energy saving.

A known living anionic polymerization is adopted in the preparation of the aromatic vinyl compound/butadiene copolymer containing polymer chains modified with a trifunctional or tetrafunctional coupling agent. For instance, an aromatic vinyl compound and 1,3-butadiene are copolymerized in a hydrocarbon solvent in the presence of an organolithium compound, and preferably in the presence of a Lewis base such as an ether compound or a tertiary amine which is used as a modifier for controlling the glass transition temperature of the produced copolymer, and after conducting the polymerization, a trifunctional or tetrafunctional coupling agent is added to the reaction mixture and the coupling reaction is conducted. In that case, the content of the polymer chains modified by the coupling agent can be controlled by selecting the ratio of the amount of the active polymer ends to the amount of the coupling agent. Preferably, the coupling agent is employed in an amount of 0.08 to 0.25 equivalent per equivalent of the polymer chain. Also, the content of the modified polymer chains can be determined from the molecular weight distribution measured by gel permeation chromatography. That is to say, the weight ratio of the modified polymer chains to the unmodified polymer chains is defined by the relative ratio of the height of a peak corresponding to the average molecular weight of the modified polymer chains (coupled polymer) to the height of a peak corresponding to the average molecular weight of the unmodified polymer chains (uncoupled polymer). The coupling is carried out in a conventional manner by using known trifunctional or tetrafunctional coupling agents. Typical examples of the coupling agent are, for instance, silicon tetrachloride, silicon tetrabromide, silicon tetraiodide, germanium tetrachloride, tin tetrachloride, methyltrichlorosilane, butyl tin trichloride, bistrichlorosilylethane and bistrichloroethane. The trifunctional and tetrafunctional coupling agents may be employed alone or in admixture thereof.

The aromatic vinyl compound/butadiene copolymers of the present invention can be used for various purposes, particularly as a rubber material for tires. The copolymers of the invention may be used alone or in admixture with natural rubber or other synthetic rubbers, and may be extended with an oil, if necessary. The copolymers of the invention can be incorporated with usual additives for preparing a cured rubber, e.g. carbon black, wax, antioxidant, curing agent and curing accelerator, and can be cured in a usual manner.

The present invention is more specifically described and explained by means of the following Examples in which all % and parts are by weight unless otherwise noted. It is to be understood that the present invention is not limited to the Examples, and various changes and modifications may be made in the invention without departing from the spirit and scope thereof.

In the following Examples and Comparative Examples, physical properties were measured under the following conditions.

(1) Glass transition temperature

The mesasurement was made by raising the temperature at a rate of 20° C./minute employing a differential scanning calorimeter made by E. I. du Pont de Nemours & Co. The transition temperature was determined from the position of the transition heat absorption peak.

(2) Roll processability

The temperature of 6 inch rolls was adjusted to 50° C., and the roll spacing was adjusted to 0.7, 1.0, 1.5 or 2.0 mm. A copolymer was wound round the roll, and the state of the copolymer was observed and estimated according to the followign criteria.

| Grade | State of polymer on roll |
|---|---|
| 5: | Winding state is very good, sheet skin is smooth and sheet has a tackiness. |
| 4: | Winding state is good, but sheet edge breaking occurs or sheet skin is somewhat rough. |
| 3: | Rubber sheet wound on the roll is lacking in tackiness or biting into rolls of bank is somewhat bad. |
| 2: | Bagging and sheet breaking occur. |
| 1: | Biting into rolls in an early stage is bad, and the polymer is not formed into a sheet and does not wind round the roll. |

(3) Kneading processability by Banbury mixer

| Grade | |
|---|---|
| 5: | A rubber composition does not crumble, thus lumping is good and it is glossy. |
| 4: | A rubber composition does not crumble, thus lumping is good, but it is not glossy. |
| 3: | Lumping is sowewhat bad, and the kneaded composition is not glossy. |
| 2: | Lumping is bad and the kneaded composition is not glossy. |
| 1: | A rubber composition lacks in lumping, thus it does not form sheets. |

(4) Extrusion processability

The processability was estimated according to ASTM D 2230 (method B). The numeral shows the sharpness of edge and the presence of cutting, and it is expressed in 10 ranks from 10 (excellent) to 1 (failure). Also, the alphabet letter shows the smoothness of the surface, and it is expressed in 5 ranks from A (excellent) to E (failure).

(5) Proportion of modified polymer chains in polymer

A gel permeation chromatograph HLC-802UR made by Toyo Soda Manufacturing Co., Ltd. was used, and columns of $10^3$, $10^4$, $10^6$ and $10^7$ were selected as distribution columns. A refractometer was used as a detector. The molecular weight distribution of a polymer was measured at 40° C. by using tetrahydrofuran as a developing solvent. The relative ratio of the height of the peak corresponding to the average molecular weight of the modified polymer chains to the height of the peak corresponding to the average molecular weight of the nonmodified polymer chains was regarded as the weight ratio of the respective polymer chains.

(6) Proportion, based on the whole polymer chains, of polymer chains having a molecular weight (calculated on the basis of standard polystyrene) of at least 5 times the molecular weight (calculated on the basis of standard polystyrene) corresponding to the peak appearing on the low molecular weight side in a molecular weight distribution curve of a copolymer obtained by a high performance liquid chromatography (hereinafter referred to as "content of particular high molecular weight polymer chains")

A high performance liquid chromatography HLC-TWINCLE made by Nippon Bunko Kogyo Kabushiki Kaisha was used, and a Shodex 80M column was selected as a distribution column. Also, a UV meter was used as a detector. The molecular weight distribution of the polymer was measured at room temperature by using tetrahydrofuran as a developing solvent. The proportion, based on the whole polymer chains, of the polymer chains having a molecular weight (calculated based on a standard polystyrene) of at least 5 times the molecular weight (calculated based on a standard polystyrene) corresponding to the peak position appearing on the low molecular weight side is indicated as a weight proportion, namely content expressed by weight %.

The molecular weight calculated on the basis of a standard polystyrene was measured from a calibration curve prepared from the relationship between the retention times and the molecular weights of standard polystyrenes made by Toyo Soda Manufacturing Co., Ltd. (A-2500 of $\overline{M}w = 2.8 \times 10^3$, F-10 of $\overline{M}w = 1.06 \times 10^5$ and F-128 of $\overline{M}w = 1.30 \times 10^6$).

(7) Wet grip index

The wet skid resistance was measured by employing a portable skid resistance tester made by Stanley with respect to a cured rubber sheet having a thickness of 6.5 mm. An asphalt surface sprayed with water of 20° C. was employed as a contact road surface.

(8) Dynamic loss value

The measurement was made by varying the temperature of a cured rubber sheet at 0.6% in initial elongation, 0.1% in amplitude and 11 Hz in frequency employing a dynamic solid viscoelastometer made by Toyo Baldwin Co., Ltd.

A cured rubber was obtained by curing the following rubber composition at 175° C. for 20 minutes.

| (Formulation) | |
|---|---|
| Ingredients | Amount (part) |
| Polymer | 100 |
| Aromatic oil | 9 |
| Stearic acid | 2 |
| Sulfur | 1.75 |
| Carbon black | 50 |
| Zinc oxide | 3 |
| Curing accelerator | 1 |

EXAMPLES 1 TO 3 AND COMPARATIVE EXAMPLES 1 TO 4

Styrene and butadiene were copolymerized in a mixed solvent of tetrahydrofuran and hexane in the presence of n-butyllithium as a polymerization initiator. After the completion of the polymerization, silicon tetrachloride was added to the reaction mixture containing an active polymer and reacted to produce a coupled polymer having a branched structure. The polymer was recovered by a methanol precipitation method.

The polymerization condition and coupling reaction condition are shown in Table 1.

Also, the properties of the copolymers and the cured products are shown in Table 2.

TABLE 1

|  | Ex. 1 | Ex. 2 | Ex. 3 | Com. Ex. 1 | Com. Ex. 2 | Com. Ex. 3 | Com. Ex. 4 |
|---|---|---|---|---|---|---|---|
| Polymerization |  |  |  |  |  |  |  |
| n-Hexane (part) | 400 | 400 | 400 | 400 | 400 | 400 | 400 |
| 1,3-Butadiene (part) | 75 | 75 | 75 | 75 | 75 | 75 | 75 |
| Styrene (part) | 25 | 25 | 25 | 25 | 25 | 25 | 25 |
| Tetrahydrofuran (part) | 3 | 3 | 3 | 3 | 3 | 3 | 3 |
| n-Butyllithium (part) | 1.4 | 1.4 | 1.4 | 1.4 | 1.4 | 1.4 | 1.4 |
| Polymerization temperature (°C.) | 30 → 60 | 30 → 60 | 30 → 70 | 30 → 80 | 30 → 80 | 30 → 50 | 30 → 50 |
| Polymerization time (hour) | 6 | 10 | 8 | 6 | 8 | 3.5 | 3.5 |
| Polymerization conversion (%) | 100 | 100 | 100 | 100 | 100 | 100 | 100 |
| Coupling reaction |  |  |  |  |  |  |  |
| Silicon tetrachloride (part) | 0.03 | 0.03 | 0.03 | 0.03 | 0.03 | 0.03 | 0 |
| Reaction temperature (°C.) | 60 | 60 | 70 | 50 | 80 | 50 | 50 |

TABLE 2

|  | Ex. 1 | Ex. 2 | Ex. 3 | Com. Ex. 1 | Com. Ex. 2 | Com. Ex. 3 | Com. Ex. 4 |
|---|---|---|---|---|---|---|---|
| Polymer |  |  |  |  |  |  |  |
| Mooney viscosity ($ML_{1+4}$, 100° C.) | 61 | 80 | 65 | 50 | 100 | 65 | 55 |
| Proportion of modified polymer chains (%) | 60 | 61 | 55 | 40 | 51 | 63 | 0 |
| Styrene content (%) | 25 | 25 | 25 | 25 | 25 | 25 | 25 |
| Vinyl content in diene portion (mole %) | 45 | 45 | 45 | 45 | 45 | 45 | 45 |
| Glass transition temp. (°C.) | −37 | −37 | −37 | −37 | −37 | −37 | −37 |
| Content of particular high molecular weight polymer chains (%) | 8.6 | 3.5 | 18.6 | 23.6 | 36.9 | 2.9 | 0 |
| Wet grip index | 59 | 59 | 59 | 59 | 59 | 59 | 59 |
| Dynamic loss values |  |  |  |  |  |  |  |
| $E''$ (kg./cm.$^2$) | 9.5 | 8.6 | 9.8 | 9.6 | 9.6 | 10.5 | 11.3 |
| $[E''/(E^*)^2] \times 10^3$ (kg/cm.$^2$)$^{-1}$ | 1.19 | 1.04 | 1.28 | 1.33 | 1.46 | 1.08 | 1.02 |
| Roll processability | 5 | 5 | 5 | 3 | 2 | 4 | 2 |
| Kneading processability | 5 | 5 | 5 | 3 | 2 | 4 | 2 |
| Extrusion processability | 10-A | 10-A | 10-A | 6-C | 5-D | 8-B | 5-D |

The copolymers of Examples 1 to 3 according to the present invention shown a high wet grip index of 59, low dynamic loss values $E''$ and $E''/(E^*)^2$, and excellent processabilities such as roll processability, kneading processability by Banbury mixer and extrusion processability, and the content of the particular high molecular weight polymer chains is within the range of not less than 3% and less than 23%. In particular, the copolymer of Example 2 has a Mooney viscosity as high as 80, but has excellent processabilities despite that copolymers having a high Mooney viscosity have been generally considered to be poor in processabilities. Example 2 shows that according to the present invention, copolymers having excellent processabilities can be prepared even if the Mooney viscosity is high.

Comparative Examples 1 to 3 show copolymers which do not fall with the scope of the present invention. That is to say, the copolymers of Comparative Examples 1 and 2 contain not less than 23% of the particular high molecular weight polymer chains, namely the polymer chains having a molecular weight of at least 5 times a molecular weight corresponding to the peak appearing on the low molecular weight side of the high performance liquid chromatography. Such copolymers show a high wet grip index of 59 and low dynamic loss values $E''$ and $E''/(E^*)^2$, but are inferior in processabilities such as roll, kneading and extrusion processabilities.

The copolymer of Comparative Example 3 contains less than 3% of the particular high molecular weight polymer chains. Such a copolymer also show a high wet grip index of 59 and low dynamic loss values, but are inferior in processabilities such as roll, kneading and extrusion processabilities.

The copolymer of Comparative Example 4 contains no particular high molecular weight polymer chains. Such a copolymer also show a high wet grip index of 59 and low dynamic loss values, but are inferior in processabilities such as roll, kneading and extrusion processabilities.

In addition to the ingredients used in the Examples, other ingredients can be used in the Examples as set forth in the specification to obtain substantially the same results.

What we claim is:

1. An elastomeric copolymer of an aromatic vinyl compound and butadiene prepared by a solution polymerization method, which has a glass transition temperature of not less then −50° C. and contains polymer chains coupled by an appropriate trifunctional or tetrafunctional coupling agent, and in which 3.5% to 18.6% by weight of all the polymer chains have a molecular weight which is equal to 5 times or more the molecular weight $M_L$ possessed by the highest number of uncoupled polymer chains in the copolymer, said molecular weight $M_L$ being represented by the top of the peak which corresponds to the uncoupled polymer chains in a high performance liquid chromatogram of said elastomeric copolymer.

2. The copolymer of claim 1, wherein said aromatic vinyl compound is styrene.

3. The copolymer of claim 1, wherein said polymer chains modified with a trifunctional or tetrafunctional coupling agent are present in an amount of not less than 35% by weight to less than 90% by weight based on all the polymer chains.

4. The copolymer of claim 1, which has a Mooney viscosity of at least 60 ($ML_{1+4}$, 100° C.).

5. The copolymer of claim 1, wherein the coupling agent is selected from the group consisting of silicon tetrachloride, silicon tetrabromide, silicon tetraiodide, germanium tetrachloride, tin tetrachloride, methyltrichlorosilane, butyl tin trichloride, bistrichlorosilylethane and bistrichloroethane.

* * * * *